[11] 3,603,822

| | | | |
|---|---|---|---|
| [72] | Inventor | Robert L. Petsinger |  |
|  |  | Upper St. Clair, Pa. |  |
| [21] | Appl. No. | 797,460 |  |
| [22] | Filed | Feb. 7, 1969 |  |
| [45] | Patented | Sept. 7, 1971 |  |
| [73] | Assignee | LNG Services, Inc. |  |
|  |  | Pittsburgh, Pa. |  |

[54] METHOD AND SYSTEM FOR MAGNETOHYDRODYNAMIC GENERATION OF ELECTRICITY
6 Claims, 1 Drawing Fig.

[52] U.S. Cl. ..................................... 310/11
[51] Int. Cl. ....................................... H02m 4/02
[50] Field of Search............................ 310/11; 176/60, 39; 60/36, 200; 62/52

[56] References Cited
UNITED STATES PATENTS

| | | | |
|---|---|---|---|
| 3,369,134 | 2/1968 | Klein et al. .................... | 310/11 |
| 3,508,090 | 4/1970 | Crampton et al. ............. | 310/11 |
| 2,862,546 | 12/1968 | Klose et al. .................... | 62/52 X |
| 3,058,314 | 10/1962 | Gardner ......................... | 62/29 |
| 3,069,847 | 12/1962 | Vest, Jr. ......................... | 60/200 |
| 3,232,050 | 2/1966 | Robinson et al. ............. | 60/36 |
| 3,239,697 | 3/1966 | Stekly............................ | 310/11 |
| 3,264,501 | 8/1966 | Kantrowitz et al............ | 310/11 |
| 3,320,443 | 5/1967 | Klein.............................. | 310/11 |

*Primary Examiner*—D. X. Sliney
*Attorney*—Brufsky, Staas, Breiner & Halsey

ABSTRACT: In the magnetohydrodynamic generation of electricity, a method and system are provided employing liquified natural gas as a source of refrigeration, as a source of gaseous medium to be ionized, as a power source for the generation of oxygen employed in the combustion process for ionization of gases, and as a fuel for various power and heat generation functions.

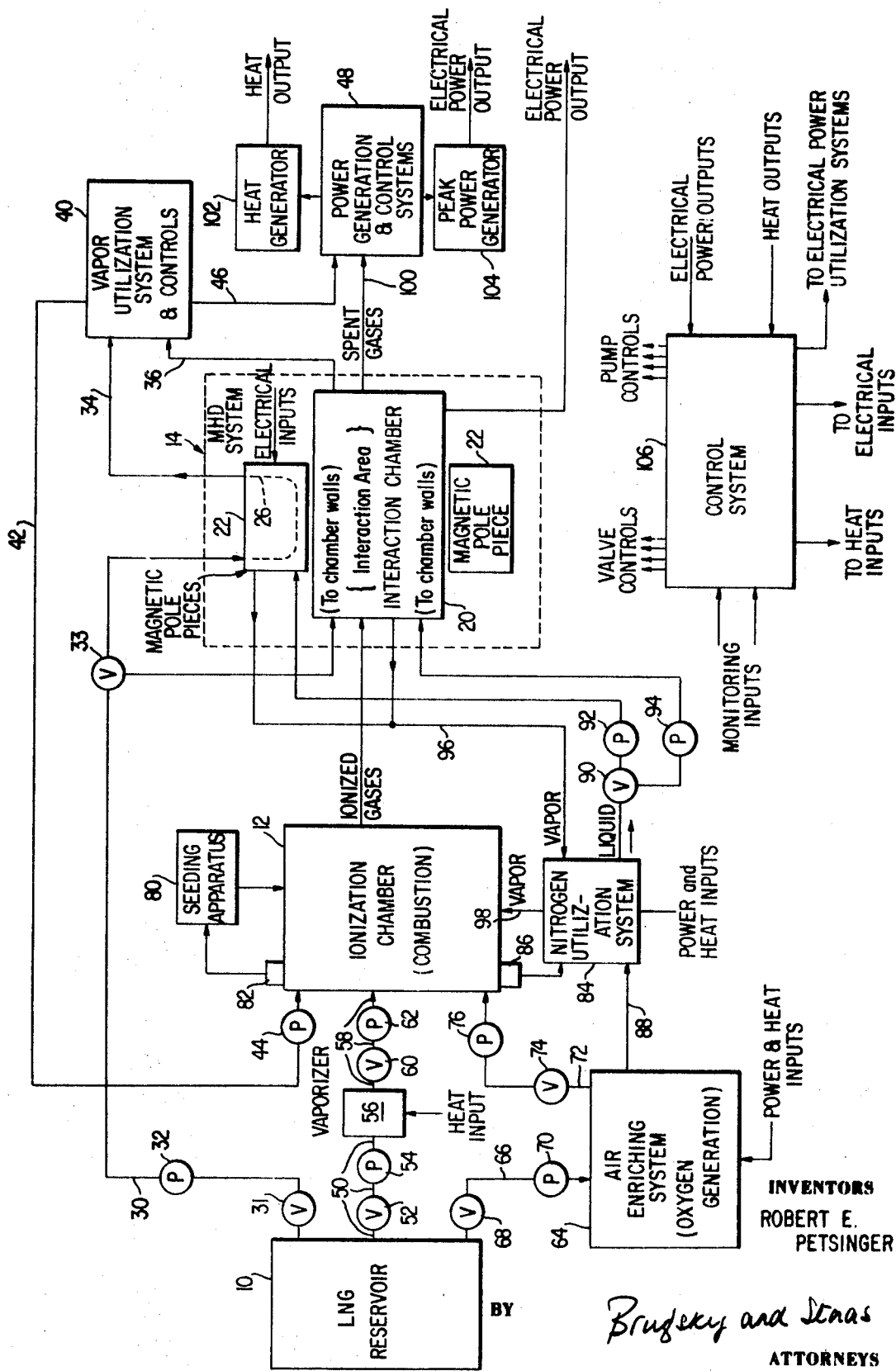

METHOD AND SYSTEM FOR MAGNETOHYDRODYNAMIC GENERATION OF ELECTRICITY

BACKGROUND OF THE INVENTION

1. Field of the Invention

This invention relates to a method and system for the magnetohydrodynamic generation of electricity and, more particularly, to such a method and system employing liquified natural gas (LNG) as a source of refrigeration, of a gaseous medium for ionization, and as a fuel for various power and heat generation functions required.

2. State of the Prior Art

The capability of generating electricity through the use of magnetohydrodynamic (MHD) techniques has long been recognized in the prior art. Only in recent years have materials been developed which permit the attainment of the extremely high temperatures required for establishing and maintaining an ionized gaseous medium for interaction with a magnetic field to effect the generation of electricity. Prior to that time, it was generally impossible to effect the necessary control of electron, or ion, mobility in the ionized medium and to control the temperature levels required in operation.

Currently, the MHD process is in the state of development. It provides high thermal efficiency, and efficiencies in excess of 55 percent may be realized.

However, the extremely high operating temperatures, in a range of 4,000 to 5,000° F., require a substantial energy input for operation. Fuels employed in prior art systems frequently are so expensive that practicable systems cannot be realized. Further, conventional fuels typically have high carbon content and generate poisons in the combustion, or ionization chamber. Such poisoning seriously reduces the efficiency of operation and contributes to rapid deterioration of the system components.

Whereas MHD systems require the establishment and maintenance of these high operating temperatures in the ionization and interaction systems, associated apparatus must be maintained at much lower temperatures. For example, the pole pieces of the magnets employed for maintaining the magnetic flux field in the interaction chamber must be maintained at a far lower temperature to assure adequate conductivity. Thus, refrigeration systems must be provided for this and related purposes. In addition, the ionized medium further requires a source of oxygen for the combustion chamber in the ionization operation. Apparatus heretofore available in the prior art for satisfying these various requirements is both complex and very expensive and thus renders the attainment of a commercially practical MHD system difficult, if not impossible.

SUMMARY OF THE INVENTION

The foregoing and other defects and disadvantages of prior art MHD systems are overcome by the MHD system and method of operation of the invention.

In accordance with the invention, liquified natural gas (LNG) is employed for numerous purposes in the magnetohydrodynamic (MHD) generation of electricity. LNG is a liquified combination of gases, primarily including methane, typically in the amount of 90–93 percent of the total gas mixture. LNG also contains small amounts of nitrogen, ethane, carbon dioxide, propane, and other like hydrocarbons. LNG has a boiling point at one atmosphere pressure of −259° F., and requires approximately 400 BTU's per liquid pound, for vaporization thereof at ambient conditions. LNG is therefore an excellent heat sink in a refrigeration process and thus is ideally suited as a source of refrigeration. In addition, LNG provides an excellent fuel, such as in any suitable combustion operation, the exhaust products from combustion being essentially smokeless. With regard to the use of LNG as a fuel source in the combustion chamber of an MHD system, the smokeless resultant exhaust products are of substantial advantage by virtue of generating essentially no poisons in the combustion chamber, as distinguished from fuels employed heretofore in the prior art. Deterioration of the combustion chamber is thus substantially reduced, as compared with prior art fuels. In addition, LNG recovered as spent gas from the ionized medium of an interaction chamber may be employed for fuel utilization purposes in conventional power generating equipment, and their exhaust products are again significant in that they do not contribute to pollution of the atmosphere.

LNG, in the liquid state, occupies approximately one six-hundred and thirty-second of the volume of the material in a gaseous state at normal ambient conditions. LNG is therefore attractive as a fuel source in that it may be efficiently transported.

Although in this specification and the claims appended hereto, reference is made to LNG, it will be appreciated that any combustible cryogenic gas may be employed in the alternative, examples thereof including methane, hydrogen, ethane, and ethylene. Thus, as employed in the specification and claims hereof, LNG is intended to include any combustible cryogenic gas.

In accordance with the invention, LNG may be employed as a source of refrigeration for the magnetic pole pieces and the walls of an interaction chamber of an MHD system thereby to protect these apparatus from the extremely high temperature of the ionized gas utilized therein. The high energy content for vaporization of LNG provides efficient cooling. The vaporized LNG recovered following the cooling is utilized in various component portions of the MHD systems. For example, the vapor may be directly employed as a combustible gas in the ionization chamber of the system. Excessive vapor may be employed directly as a fuel in conventional power generation systems.

The combustion process also requires a supply of a combustion maintaining medium, such as oxygen-enriched air or relatively pure oxygen. LNG may be employed as a source of refrigeration, heat, and other power for operating such an air-enriching system or oxygen generation system. A suitable LNG oxygen generating system is disclosed and comprises the subject matter of the copending application of Robert E. Petsinger entitled "Method and System for Enriching Air Using LNG," filed concurrently herewith. Byproducts from such a system include nitrogen in liquid state or in a very low temperature vapor, both of which may act as a source of refrigeration for the same purposes as LNG in the present invention. The nitrogen vapor may also be employed for temperature control in the combustion chamber.

The spent, ionized gases from the interaction chamber, including LNG vapor still in the combusting state, may further be employed as a power source, or fuel, in conventional power generating systems which conveniently may provide sources of heat and electrical power as required in various apparatus of the system.

BRIEF DESCRIPTION OF THE DRAWINGS

The single figure of the drawings comprises a block diagram of an MHD system in accordance with the invention, also serving to illustrate the method of the invention.

DETAILED DESCRIPTION OF THE INVENTION

With reference to the single figure of drawings, a system in accordance with the invention for MHD generation of electricity includes, as basic components, an LNG reservoir 10, an ionization or combustion chamber 12, and an MHD system 14. The terminology of the MHD system 14 is intended to identify the specific includes, of the complete MHD system in which the generation of electrical power by interaction of a flow of ionized gases through a magnetic field is realized. Since the generation of electrical power by this interaction is a well-known technique, the MHD system 14 is shown in schematic form, sufficient to describe its operation in the context of the present invention.

The MHD system 14 includes an interaction chamber 20 including walls or similar structure defining a chamber through which an ionized gaseous medium is projected, or flows. Means for generating and maintaining a magnetic flux field within that chamber are provided, as illustrated by the magnetic pole pieces 22, understood to be part of a suitable magnetic field generating apparatus. Typically, such apparatus comprises an electromagnet and thus there is schematically indicated an electrical input to one of the pole pieces 22. The interaction chamber 20 further has associated therewith means for deriving an output from the electrical field generated by the interaction of the moving ionized medium and the magnetic field, schematically illustrated by the lead 24 associated with appropriate electrodes of the MHD system 14 (not shown) from which the electrical power output is derived.

As discussed above, the temperature of the gases within the chamber 20 are from 4,000 to 5,000° F., and it is therefore necessary to cool the walls of the interaction chamber 20 and the pole pieces 22. Cooling is, of course, essential to assure stability of these elements and adequate electrical conductivity. There is schematically illustrated in one of the pole pieces 22 a channel 26 through which a refrigerant which, in accordance with the invention, comprises LNG, is caused to flow. Appropriate channels are provided in both pole pieces and also in the walls of the interaction chamber 20. As described hereafter, preferably liquid nitrogen is circulated through the refrigerant channels of the chamber walls, although LNG or a combination thereof may be employed.

The LNG reservoir 10 is a specially constructed container for supplying a source of LNG to the system. A conduit 30 including a control valve 31, a pump 32, and a valve 33, with suitable actuation of the valves 31 and 33 and the pump 32, supplies LNG to the refrigerant channel 26 of the pole piece 22. The valve 33 may also be controlled to supply LNG to the chamber walls of the interaction chamber 20 for refrigeration purposes.

Conduits 34 and 36 convey the LNG, typically now vaporized by the heat conducted from the pole pieces 22 and the walls of chamber 20, respectively, to a vapor utilization system 40, which may include suitable controls for monitoring the flow thus received. At least a portion of the vaporized LNG is provided to conduit 42, including poles 44, for injection into the ionization chamber 12. A portion of the vapor may also be conveyed through conduit 46 to a power generation and control system 48 for a purpose to be described.

In the event that inadequate vaporized LNG is available for the ionization chamber 12, vaporized LNG may be obtained directly from the reservoir 10 through the following system. Conduit 50 including control valve 52 and pump 54 may supply LNG from reservoir 10 to a vaporizer 56 to which a heat input is supplied from sources to be described. Vaporized LNG from vaporizer 56 is then conveyed through conduit 58 including control valve 60 and pump 62 for injection into the ionization chamber 12.

As discussed above, oxygen-enriched air, or relatively pure oxygen is required for maintaining combustion of the vaporized LNG in the ionization chamber 12. The necessary oxygen may be provided by an air-enriching system, or oxygen generation system 64. Such a system is disclosed in and comprises the subject matter of the above-referenced application. A conduit 66 including control valve 68 and pump 70 supplies LNG from reservoir 10 to the system 64. The enriched air, or oxygen, is in turn supplied from system 64 through conduit 72 including control valve 74 and pump 76 for injection into the ionization chamber 12. The vaporized LNG, and other combustible fuels, if desired, are mixed and fired in the chamber 12 to the described temperatures for producing an ionized gaseous medium. The flame temperature which may be realized with a combination of oxygen and vaporized LNG is approximately 4,000° F. If greater temperatures are desired, a seeding apparatus 80 controlled by temperature sensor 82 may effect seeding of the chamber 12. Typical seeding materials include small amounts of finely dispersed salts such as potassium nitrate and potassium sulfates, and similar salts.

In operation, it may also be necessary to reduce the temperature of the ionized gas and thus nitrogen vapor may be injected into the chamber 12 from a nitrogen utilization system 84, operative in response to a temperature sensor 86. Conveniently, nitrogen in a liquid or more typically combination of liquid and vapor states is produced as a byproduct from the air-enriching system 64 and conveyed through conduit 88 to the nitrogen utilization system 84. The system 84 supplies liquid nitrogen, as required, through a control valve 90 and pumps 92 and 94 as a coolant selectively to the pole pieces 22 and the walls of chamber 20 for refrigeration purposes. The liquid nitrogen is vaporized in providing this refrigeration and the vapor collected and returned through conduit 96 to the system 84. Thus, either from the nitrogen obtained through conduit 88 or through conduit 96, the system 84 supplies nitrogen vapor through conduit 98 to the chamber 12. The injected nitrogen, being noncombustible, operates to reduce the temperature of the ionized medium.

The ionized gaseous medium thus produced by the chamber 12 typically exits through a venturi opening to enter the interaction area of the interaction chamber 20. The flow of new gas into the chamber 12 and the combustion therein establishes the required pressure for maintaining a required rate of flow of the ionized medium through the interaction area. In a well-known manner, the flow of the ionized gas interacts with the magnetic field in the interaction area to generate an electrical power output which is supplied through suitable electrodes to the output lead 24. Such electrodes must be capable of withstanding the high temperatures of the ionized gas, and thus typically are formed of graphite-carbon compositions and various other compositions as employed in consumable electrodes.

The spent gases exiting from the interaction chamber typically are not completely combusted and are of high temperature and thus comprise a source of power which may be employed to increase the efficiency of the system. As diagrammatically shown, these spent gases are supplied to the system 48 through conduit 100 along with any excess vaporized LNG through conduit 46. The system 48 may include any of various conventional apparatus for utilizing the energy content of the spent gases such as gas drive compression systems, internal combustion and turbine engines, and the like. Specific examples of such power systems include the heat generator 102 and a peak power generator 104 which respectively provide heat and electrical power outputs.

A control system 106 is provided for monitoring the functions of the system including flow of the various above-described materials, including liquids and gases, temperature levels, electrical power and heat outputs, and the like. In accordance with the required parameters of operation, the control system 106 provides valve control and pump control outputs, for example, along with other output controls for regulating the operation of the system. Through controls, or directly, the system 106 also regulates the supply of heat and electrical power to the subcomponents of the system for the purposes described above.

It is apparent that various intermediate refrigerants may be employed in lieu of direct use of LNG and nitrogen in the cooling operations. Although alternative systems for effecting such a modification of the disclosed system are not shown, they will be readily apparent to those skilled in the art. Further, supplemental refrigeration utilizing other cryogens such as liquid hydrogen or liquid helium obtained from external sources, may be employed if desired.

I claim:

1. In a magnetohydrodynamic system having a combustion chamber for ionizing a gaseous medium, and having an interaction chamber in which the ionized gaseous medium is subjected to a magnetic field established by a magnetic structure, to produce electrical power, the combination comprising
 a source of cryogenic liquified natural gas,
 means for supplying liquified natural gas from said source to said magnetic structure as a refrigerant to cool said magnetic structure, means for receiving vaporized natural gas derived from said liquified natural gas upon cooling of said magnetic circuit and for supplying the vaporized natural gas to said combustion chamber as a combustible high temperature fuel to promote ionization within said combustion chamber, means for transporting the ionized gaseous medium consisting at least in part of vaporized natural gas from said combustion chamber to said interaction chamber, means for generating oxygen and nitrogen and for supplying the generated oxygen to said combustion chamber to promote combustion of said fuel therein, and means for supplying said nitrogen to said magnetic structure as a refrigerant for further cooling said magnetic structure.

2. In a magnetohydrodynamic system according to claim 1, further comprising means for supplying said nitrogen for controlling the temperature of said ionized gaseous medium.

3. In the magnetohydrodynamic system according to claim 1, said combination further comprising means for supplying said liquified natural gas from said source thereof to said oxygen and nitrogen generating means as the power for generating an oxygen-rich atmosphere.

4. In the magnetohydrodynamic system according to claim 1, said combination further comprising:

means further supplying said liquified natural gas from said source to the walls of said interaction chamber.

5. In the magnetohydrodynamic system according to claim 1, said combination further comprising:

means responsive to vaporized natural gas emanating from said interaction chamber as a fuel for auxiliary power generation.

6. In the magnetohydrodynamic system according to claim 5, said combination further comprising:

means responsive to vaporized natural gas received by said receiving means for supplying a portion of said vaporized natural gas to said auxiliary power generation means as additional fuel therefor.